Dec. 18, 1928.
H. S. VINCENT
1,695,399
LOCOMOTIVE CONSTRUCTION
Filed Jan. 28, 1925
2 Sheets-Sheet 1
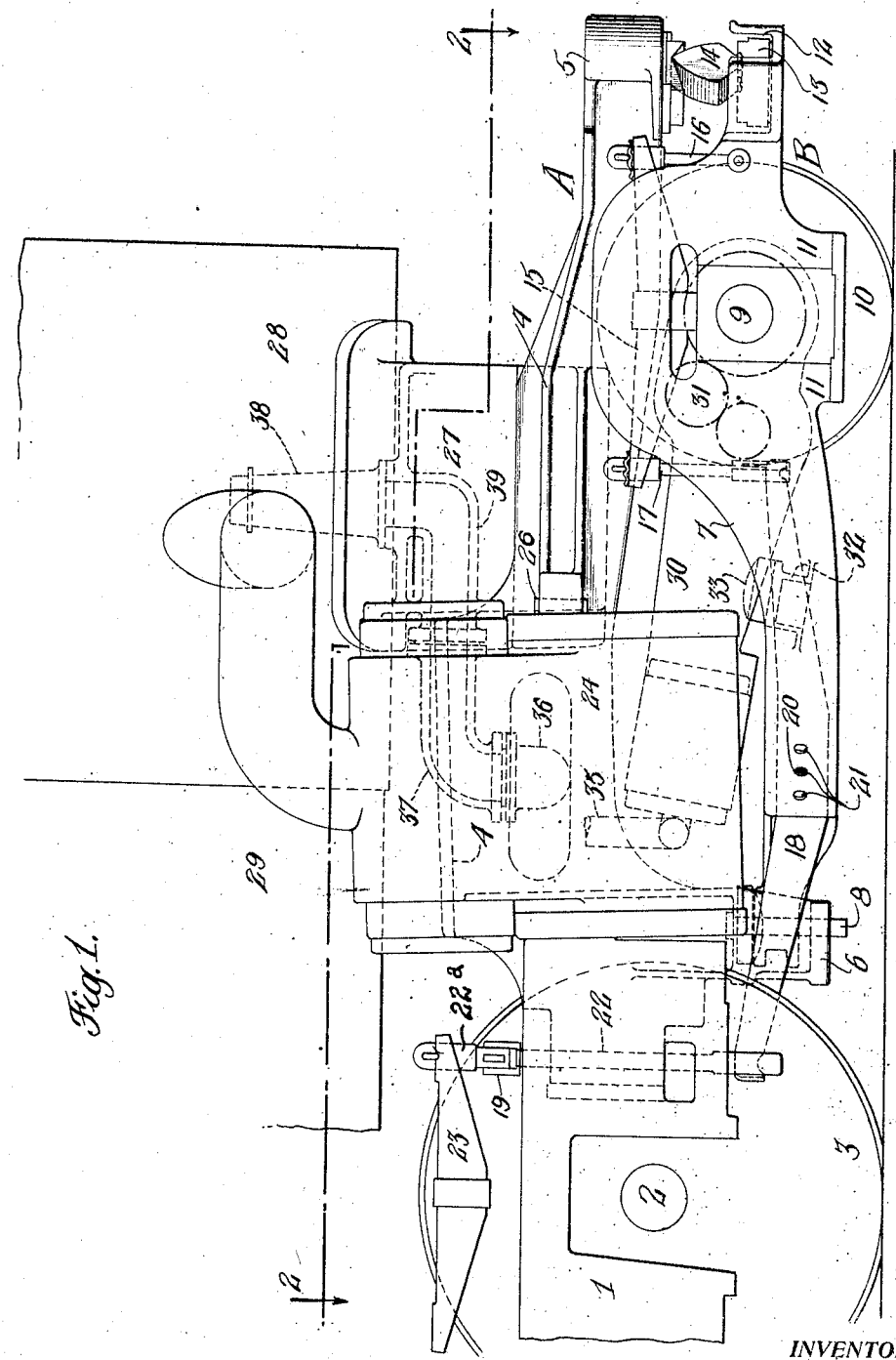
INVENTOR
Harry S. Vincent
BY
Synnestvedt & Lechner
ATTORNEYS Dec. 18, 1928.

H. S. VINCENT 1,695,399

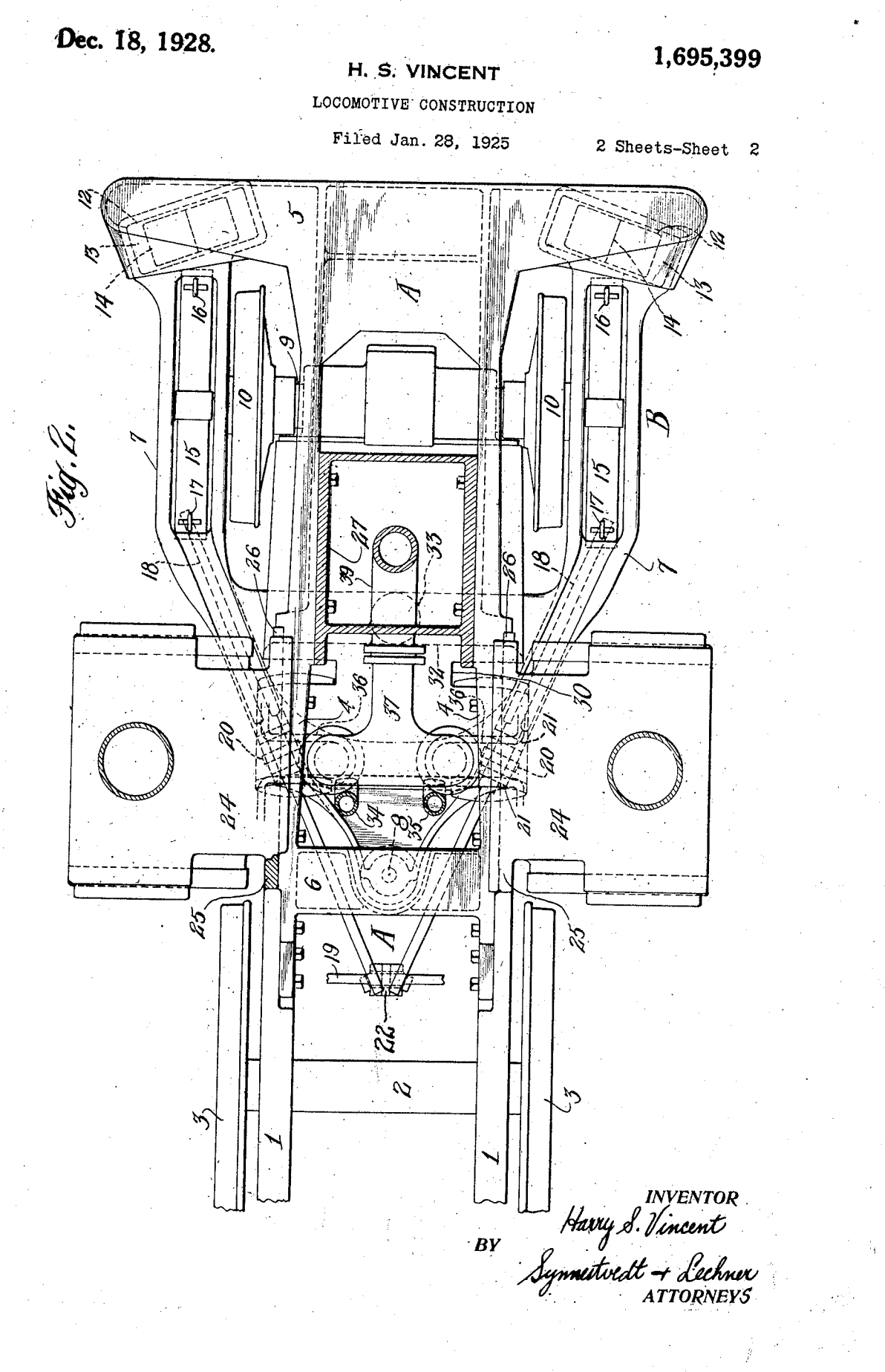

LOCOMOTIVE CONSTRUCTION

Filed Jan. 28, 1925   2 Sheets-Sheet 2

INVENTOR
Harry S. Vincent
BY
Synnestvedt + Lechner
ATTORNEYS

Patented Dec. 18, 1928.

1,695,399

UNITED STATES PATENT OFFICE.

HARRY S. VINCENT, OF RIDGEWOOD, NEW JERSEY, ASSIGNOR TO FRANKLIN RAILWAY SUPPLY COMPANY, A CORPORATION OF DELAWARE.

LOCOMOTIVE CONSTRUCTION.

Application filed January 26, 1925. Serial No. 5,183.

This invention relates to certain improvements in locomotive construction particularly associated with the forward end of the locomotive.

Among the primary objects of my invention are first—the provision of a booster at the front end of a locomotive; second—the provision of a radial leading truck for the front end of a locomotive; third—the provision of an improved front end frame construction; fourth—the provision of a longer boiler of capacity greater than normal; and fifth—the provision of suitable means for distributing the weight to be carried by the leading truck.

More specifically considered I provide a radial leading truck for locomotives in which the pivot is located behind the wheels and which is provided with suitable centering means; a three point support for the weight imposed upon the truck; springs over the truck axle with equalizing means connecting them to the driving springs or main spring rigging of the locomotive; a support for a booster motor on the truck frame between its pivot and its wheel; a unitary front extension member adapted to be secured to the main side frames of the locomotive, said member having its sides integral with the bumper; means for pivoting the radial truck to said extension member; means for securing separate cylinder castings to said extension member; means for securing the saddle casting to said extension member ahead of the cylinder castings; and means for carrying the locomotive exhaust through a conduit formed partly on the saddle casting.

How all of the foregoing objects together with any other objects which may appear hereinafter or are incident to my invention are obtained may be seen from inspection of the accompanying drawings which illustrate the invention in preferred form, and wherein:

Fig. 1 is a partial side elevation of the forward end of a locomotive embodying my improvements and Fig. 2 is a plan section taken approximately upon the lines 2—2 of Fig. 1.

Referring to the drawings it will be seen that the locomotive main frames 1 terminate just forward of the front axle 2 with its drivers 3. Secured to these main frames is a unitary front extension member or casting A composed of the side frame extension members 4, the integral buffer 5 and the rear cross member 6.

The rear end of the frame 7 of the radial leading truck B is pivoted to the center of the cross member 6 upon the pin 8. The truck is of the outside bearing type with pedestal jaws 11 around the axle 9 to the outside of the wheels 10 and at its forward end the frame 7 in front of the wheels 10 is provided with recesses 12 for holding the blocks 13 upon which the centering rockers 14 are adapted to rest. Provision is made for two of the centering rockers one at each side of the forward end of the truck immediately below the ends of the bumper 5 so that the centering action takes place between the bumper and the truck frame immediately therebelow. A portion of the superimposed weight of the locomotive is, of course, transmitted to the truck through the rockers which form two points of support. A third point of support is formed at the pivot.

Over the ends of the axle 9 are the springs 15 the forward ends of which are connected by hangers 16 to the truck frame 7. The rear ends of the springs 15 are connected by hangers 17 to the forward ends of the equalizers 18, the rear ends of which rest upon the cross equalizer 19 of the main spring rigging thru the medium of the hanger 22 at the center of the cross equalizer. The frame 7 is hollowed out to receive the equalizers 18 which are pivoted therein upon the pins 20. A series of holes 21 are provided in the frame 7 for purposes of adjustment in so far as pivoting of the levers 18 is concerned.

The cross equalizer 19 of the main spring rigging is, of course, connected by suitable hangers 22ª to the forward ends of the main driving springs 23. The weight carried by the truck is thus properly equalized between it and the main drivers.

At the outside of each side frame extension 4 is carried a cylinder casting 24, there being a flanged base or plate 25 fitting against the face of the members 4. Proper position is secured by means of the wedges 26. The cylinder castings may be bolted in place.

The saddle casting 27 is bolted securely to the inside of the frame extensions 4 ahead of the cylinder castings and the upper portion is, as usual, secured to the underside of the smoke box 28. The locomotive exhaust is carried first inwardly through the passages 36 formed as a part of the cylinder castings, then inwardly, upwardly and forwardly through the T-shaped casting 37, and finally forwardly to the exhaust nozzle 38 through the conduit 39 formed in the saddle casting 27.

It will be seen that the construction described provides a forward extension of the main frames over which a materially lengthened boiler 29 can project. The arrangement therefor provides an increased boiler capacity and the incidental additional weight is, in the main, carried by the leading truck without materially adding to the weight already carried by the drivers. Furthermore, the construction moves the center of gravity of the load forwardly and thereby makes possible the application of a larger fire box, stoker or booster at the rear of the locomotive without imposing excessive weight on the trailer wheels or rear driver. The added weight insures effective tractive effort which I arrange to make available by means of the booster motor 30 adapted to drive the truck axle 9 through the gearing 31. The forward end of the booster is carried as usual upon the axle 9 and toward the rear of the booster additional support is provided through the medium of the cross member 32 between the sides of the frame 7 of the truck B, the motor resting upon a rounded seat 33 near the center of the cross member. It will be noted that the cross member 32 with its seat for supporting the booster is located between the wheels of the truck and its pivot.

Arrangements are made for supplying the booster with steam from the main boiler of the locomotive through the pipe 34, the exhaust steam being carried up to the locomotive exhaust line through the pipe 35 so as to assist in drafting the locomotive.

It will be seen that I have provided a construction which is exceedingly simple and yet entirely adequate as to strength; one which provides a three point support for the load; one which enables me to make use of the weight carried by the leading truck for the purpose of aiding the locomotive in starting or at slow speeds; one which is relatively easy of assembly; and one which, by moving forwardly the center of gravity of the load, makes it possible to apply a larger fire box, stoker or booster to the trailer truck without imposing excessive weight on trailer wheels or rear drivers. Many advantages in the construction will occur to those familiar with this art.

I claim:—

1. In a locomotive, the combination of a unitary front extension member secured to the main frames, a radial leading truck pivoted to the rear of said extension member and receiving load at said pivot, and means for transmitting load to the forward end of said truck in front of its wheels.

2. In a locomotive, the combination of a unitary front extension member secured to the main frames, a radial leading truck pivoted to the rear of said extension member and receiving load at said pivot, means for transmitting load to the forward end of said truck in front of its wheels, and spring rigging on the truck connected to the spring rigging of the locomotive.

3. In a locomotive, the combination of a radial leading truck and centering means between the locomotive bumper and said truck.

4. In a locomotive having main side frames, the combination of a front extension for said main frames comprising a unitary side frame structure and bumper.

5. In a locomotive having main side frames, the combination of a front extension for said main frames comprising a unitary side frame structure and bumper and means for connecting said extension to said main frames.

6. In a locomotive having main side frames, the combination of a front extension for said main frames comprising a unitary side frame structure and bumper, a leading truck, and means for transmitting load to said truck through said unitary extension.

7. In a locomotive having main side frames, the combination of a front extension for said main frames comprising a unitary side frame and bumper casting, a radial leading truck pivoted to said unitary casting, and centering means between the casting and the truck.

8. In a locomotive having main side frames, the combination of a front extension for said frames comprising a unitary side frame and bumper, and means for attaching the locomotive cylinders to said extension.

9. In a locomotive having main side frames, the combination of a front extension for said frames comprising a unitary side frame and bumper, and means for attaching the locomotive cylinders and the saddle to said extension.

10. In a locomotive having main side frames, the combination of a front extension for said frames comprising a unitary side frame and bumper, and a leading truck pivoted to said extension.

11. In a locomotive, the combination of a unitary front extension member secured to the main frames, a radial leading truck pivoted to the rear of said extension member, and centering means between said member and the forward end of said truck ahead of its wheels.

12. In a locomotive having main side frames, the combination of a front extension for said main frames comprising a unitary side frame and bumper casting, a radial leading truck, and a lengthened boiler extending out over said casting, the weight of the boiler being in part at least carried by said truck through said casting.

13. In a locomotive having main side frames, the combination of a front extension for said main frames comprising a unitary side frame and bumper casting, a radial leading truck, a lengthened boiler extending out over said casting, the weight of the boiler being in part at least carried by said truck through said casting and a locomotive booster for driving wheels of said truck.

14. In a locomotive, the combination of a radial leading truck, a booster for driving its wheels, and booster supporting means on the truck between the pivot and the wheels.

15. In a locomotive, the combination of a unitary front extension member secured to the main frames, a saddle casting secured to said extension member and to the locomotive smoke box, and cylinder castings secured to the extension member between said saddle casting and the main frames.

16. In a locomotive, the combination of a unitary front extension member secured to the main frames, a saddle casting secured to said extension member and to the locomotive smoke box, cylinder castings secured to the extension member to the rear of said saddle casting and a locomotive exhaust conduit formed in part in the saddle casting.

17. In a locomotive having main side frames, the combination of a unitary front extension casting for said main frames having a plurality of load transmitting means, a radial leading truck, and a boiler extending out over said casting, the weight of the boiler being in part at least carried by said truck thru the load transmitting means of said casting.

18. In a locomotive having main side frames, the combination of a unitary front extension casting for said main frames, a radial leading truck, a lengthened boiler extending out over said casting, the weight of the boiler being in part at least carried by said truck thru said casting and a locomotive booster for driving wheels of said truck.

In testimony whereof, I have hereunto signed my name.

HARRY S. VINCENT.